US006994389B1

United States Patent
Graffy et al.

(10) Patent No.: US 6,994,389 B1
(45) Date of Patent: Feb. 7, 2006

(54) UNIVERSAL TRUCK BED EXTENDER

(75) Inventors: Thomas F. Graffy, Paramount, CA (US); Stepan Gevorkyan, Paramount, CA (US)

(73) Assignee: Top Line Manufacturing, Inc., Paramount, CA (US)

( * ) Notice: Subject to any disclaimer, the term of this patent is extended or adjusted under 35 U.S.C. 154(b) by 0 days.

(21) Appl. No.: 10/939,152

(22) Filed: Sep. 13, 2004

(51) Int. Cl.
*B60P 3/34* (2006.01)

(52) U.S. Cl. .................... 296/26.11; 296/26.08
(58) Field of Classification Search ............ 296/26.11, 296/57.1, 26.01
See application file for complete search history.

(56) References Cited

U.S. PATENT DOCUMENTS

| | | | | |
|---|---|---|---|---|
| 2,872,239 A | * | 2/1959 | Bowness et al. | 296/26.11 |
| 4,472,639 A | * | 9/1984 | Bianchi | 296/26.11 |
| 4,531,773 A | * | 7/1985 | Smith | 296/26.11 |
| 5,658,033 A | * | 8/1997 | Delaune | 296/26.08 |
| 5,775,759 A | * | 7/1998 | Cummins | 296/26.11 |
| 5,788,311 A | * | 8/1998 | Tibbals | 296/26.11 |
| 5,806,907 A | * | 9/1998 | Martinus et al. | 296/26.11 |
| 5,857,724 A | * | 1/1999 | Jarman | 296/26.11 |
| 5,941,588 A | * | 8/1999 | Marconi | 296/26.11 |
| 6,007,127 A | * | 12/1999 | Garofalo | 296/26.11 |
| 6,019,410 A | | 2/2000 | Trostle et al. | 296/26.11 |
| 6,113,173 A | | 9/2000 | Leitner et al. | 296/26.11 |
| 6,120,076 A | | 9/2000 | Adsit et al. | 296/26.11 |
| 6,179,360 B1 | * | 1/2001 | Davian | 296/26.11 |
| 6,257,637 B1 | * | 7/2001 | Reed | 296/26.08 |
| 6,279,980 B1 | | 8/2001 | Straschewski | 296/57.11 |
| 6,340,190 B1 | * | 1/2002 | Rosebrugh et al. | 296/26.11 |
| 6,422,627 B1 | * | 7/2002 | Kuhn et al. | 296/26.1 |
| 6,422,630 B1 | * | 7/2002 | Heaviside | 296/26.11 |
| 6,513,850 B1 | * | 2/2003 | Reed | 296/26.08 |
| 6,540,123 B1 | * | 4/2003 | Kmita et al. | 296/26.11 |
| 6,550,841 B1 | * | 4/2003 | Burdon et al. | 296/26.11 |
| 6,739,639 B1 | * | 5/2004 | Chumley et al. | 296/26.11 |
| 6,948,755 B1 | * | 9/2005 | Bauer | 296/37.6 |

* cited by examiner

*Primary Examiner*—Kiran B. Patel
(74) *Attorney, Agent, or Firm*—Edgar W. Averill, Jr.; Kenneth L. Green

(57) ABSTRACT

A truck bed extender is attached to a tail gate by mounting brackets. The mounting brackets attach to the tail gate only, and require absolutely no alterations to the truck bed. The truck bed extender may be easily removed by removing two pins or may be folded against the tail gate for minimum intrusion into the truck bed when the tail gate is closed. A telescoping back section may be adjusted for various truck bed widths. Corners of the truck bed extender are squared off to maximize use of the extended truck bed.

18 Claims, 8 Drawing Sheets

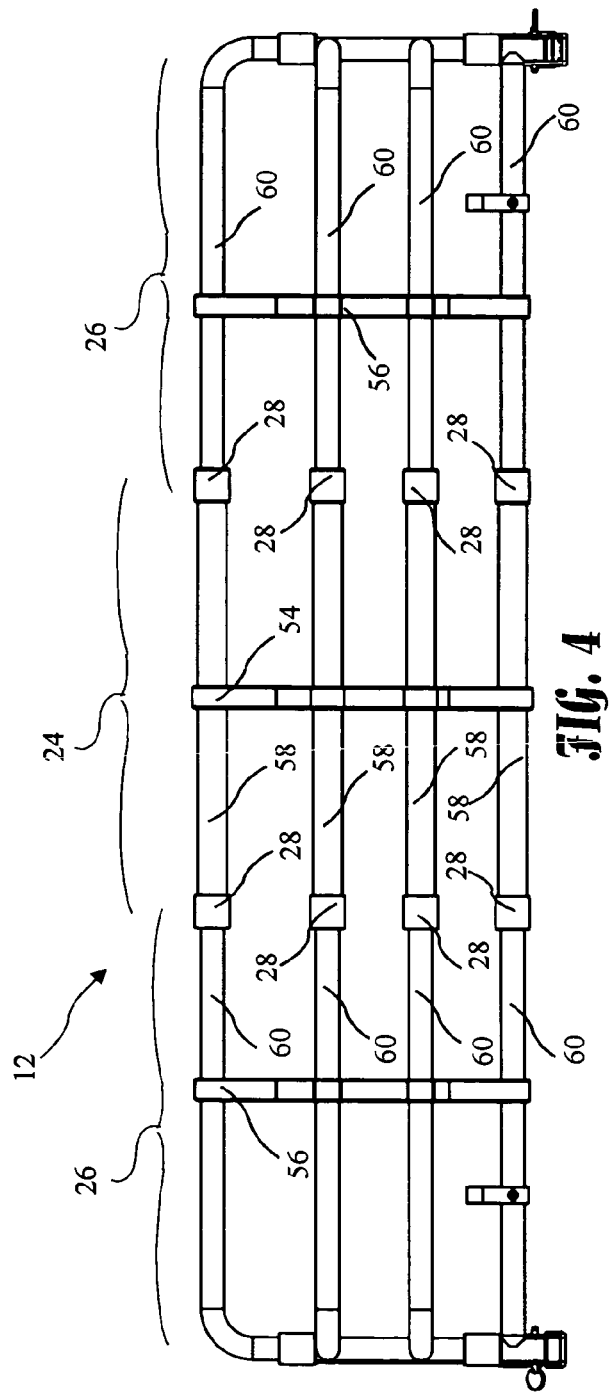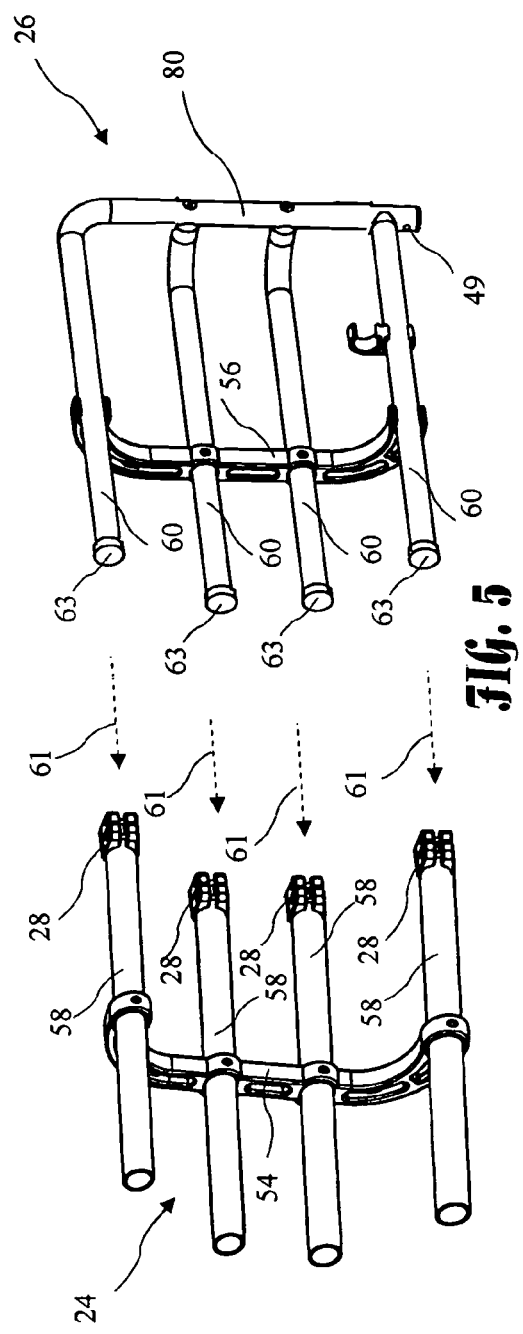
FIG. 4
FIG. 5

UNIVERSAL TRUCK BED EXTENDER

BACKGROUND OF THE INVENTION

The present invention relates to pick-up truck bed extenders and more particularly to a truck bed extender particularly useful for both extended cab picks-ups and Sport Utility Vehicles (SUVs) having beds.

Pickup trucks have become extremely popular, and currently outsell conventional autos. A high percentage (85% plus) of pick-up trucks are now made with extended cabs, or quad cabs (4 doors). As a result of the increased cab size, the space in the truck bed has been reduced accordingly.

Truck bed extenders have been introduced to increase the useable truck bed length. Known truck bed extenders are pivotally mounted to the truck bed, and rotate from a stored position in the truck bed to an extended position over a lowered tailgate. In the extended position, the useable space of the truck bed includes space above the lowered tailgate. When the truck bed extender is pivoted back to the stored position, the truck bed extender takes up about two feet of the already shortened truck bed.

Additionally, truck bed extenders must be designed to fit specific truck bed widths and other variations, and new widths and other variations may arise as new pick-up and SUV models are introduced. Known truck bed extenders therefore require multiple models for compatibility with a wide range of pick-ups and SUVs, resulting in an increase in the stock or inventory level of distributors and dealers.

Known truck bed extenders also have a continuous curved profile which reduce space in the extended truck bed.

BRIEF SUMMARY OF THE INVENTION

The present invention addresses the above and other needs by providing a truck bed extender which is attached to a tail gate by mounting brackets. The mounting brackets attach to the tail gate only, and require absolutely no alterations to the truck bed. The truck bed extender may be easily removed by removing two pins or may be folded against the tail gate for minimum intrusion into the truck bed when the tail gate is closed. A telescoping back section may be adjusted for various truck bed widths. Corners of the truck bed extender are squared off to maximize use of the extended truck bed.

In accordance with one aspect of the present invention, there is provided a truck bed extender which is attached to the tail gate by a pair of mounting brackets. The mounting brackets hold the truck bed extender in either an open position while in use, or in a folded position when not in use. The present invention thus provides a truck bed extender requiring attachment to the tail gate only.

In accordance with another aspect of the present invention, the truck bed extender includes a rear member having a center section and two telescoping end sections, and the width of the rear member may be adjusted to fit any truck bed by sliding end horizontal tubes of the end sections into or out of center horizontal tubes of the center member. The present invention thus provides a single truck bed extender suitable for a variety of truck bed widths thereby eliminating the need to stock a variety of truck bed extender models.

In accordance with a third aspect of the present invention, the truck bed extender may be folded against the tail gate when not in use. In such folded position, the truck bed extender takes up only about five inches of the truck bed area. The ability of the truck bed extender to fold against the tail gate further conveniently allows the use of the truck bed extender with popular tonneau covers or truck caps (also called camper shells) which are not compatible with know pivoting truck bed extenders.

In accordance with yet another aspect of the present invention, the truck bed extender may be removed or installed in about 30 seconds by removing or inserting two pins holding the truck bed extender to mounts on the tail gate. The truck bed extender further has squared off rear corners to maximize the area of the extended truck bed.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 is a rear member of the truck bed extender.

FIG. 5 depicts the cooperation of a center section and an end section of the rear member of the truck bed extender.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
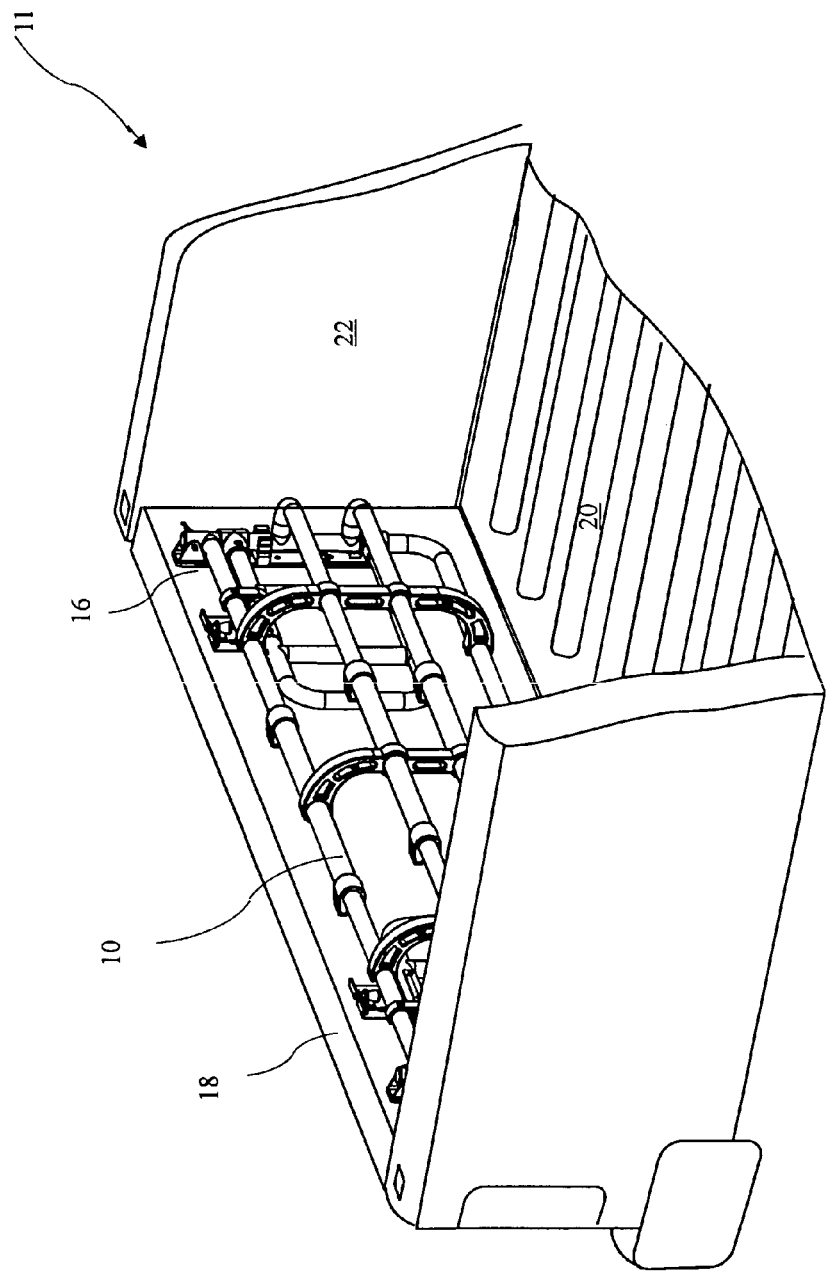
FIG. 1 shows a truck bed extender according to the present invention folded against a closed tail gate.

A truck bed extender 10 according to the present invention is shown attached to a closed tail gate 18 in FIG. 1. The closed tail gate 18 closes a truck bed 11 formed by a floor 12 and wall 22. The truck bed extender 10 is folded against the tail gate 18, thereby minimizing any encroachment into the truck bed 11 and is attached to the tail gate 18 by mounting brackets 16. The truck bed extender 10 comprises a rear section 12 (see FIG. 4), and two side sections 14 (see FIG. 7). In the position shown in FIG. 1, the rear section 12 is in a first folded position against the tail gate 18, and the side sections 14 are in a second folded position against the rear section 12. As shown in FIG. 1, the side sections 14 are sandwiched between the rear section 12 and the tail gate 18.

Figure 2:
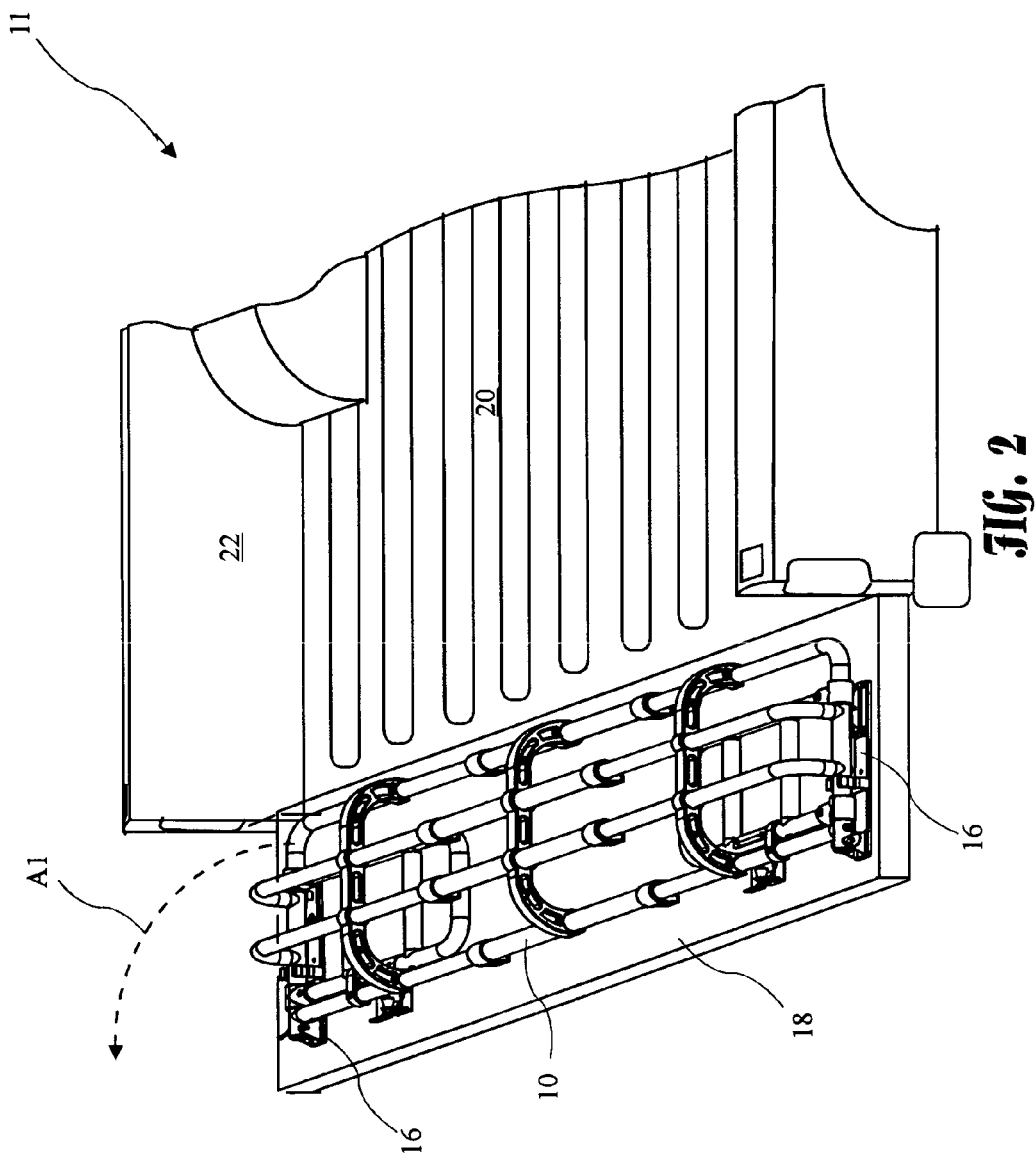
FIG. 2 shown the truck bed extender folded against an open tail gate.

A second view of the truck bed extender 10, folded against the tail gate 18, now open, is shown in FIG. 2. The truck bed extender 10 may be pivoted as indicated by first arc A1 from the first folded position which is substantially parallel to the tail gate 18 (as shown), to a first open position substantially perpendicular to the tail gate 18. The truck bed extender 10 need not be precisely perpendicular to the tail gate 18 to be useful, but is preferably approximately perpendicular to the tail gate 18. For example, the tail gate 18 may not open to a position exactly parallel with the floor 20, in which instance, it may be preferable to angularly bias the truck bed extender 10 relative to the tail gate 18.

Figure 3:
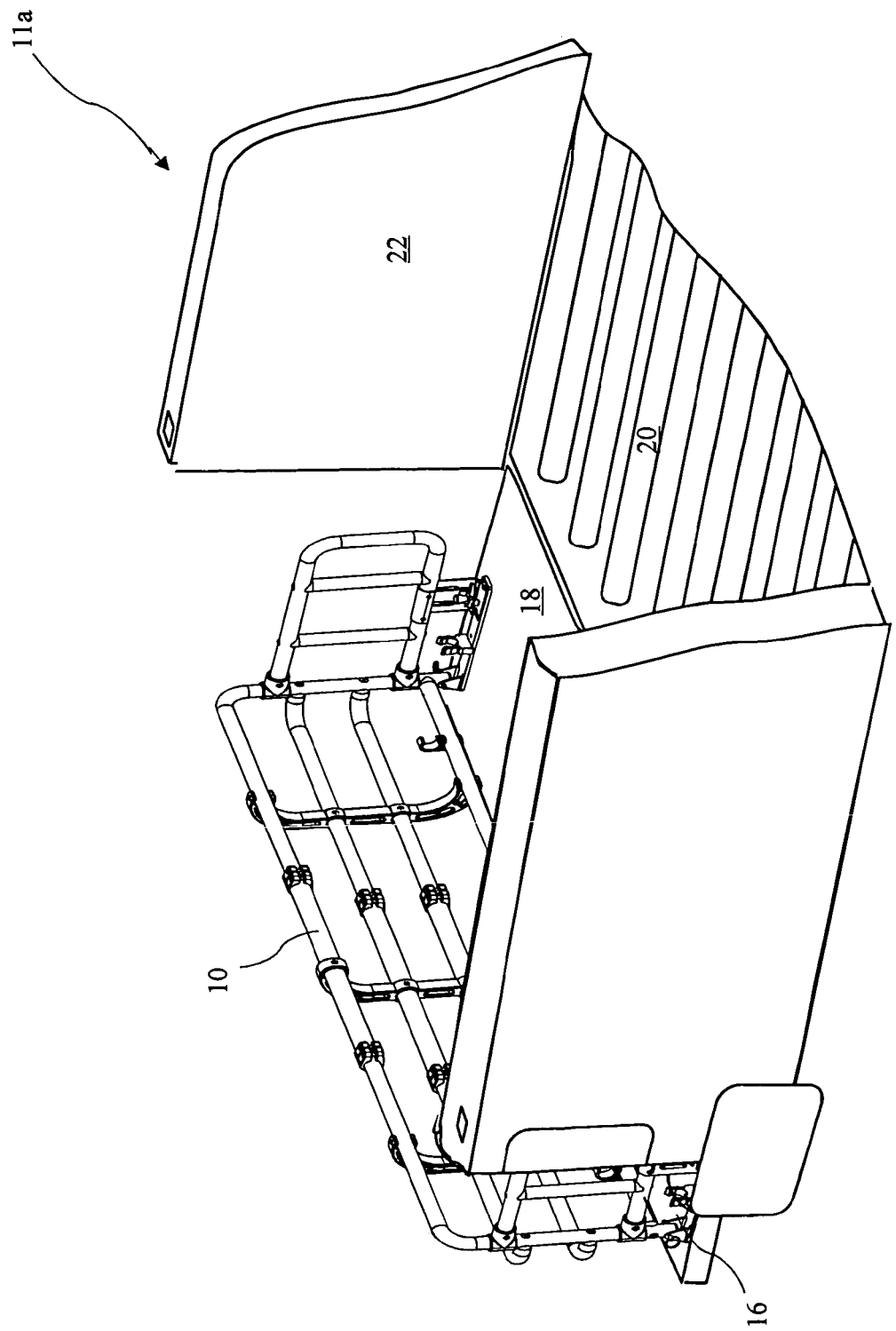
FIG. 3 shown the truck bed extender opened on the open tail gate.

The rear section 12 is shown in the first open position and the side sections 14 are shown in a second open position in FIG. 3, thereby providing an extended truck bed 11a. As can be seen, the truck bed extender 10 is attached to the mounting brackets 16, and the mounting brackets 16 are attached to the tail gate 18. The mounting brackets 16 are thus the only means necessary for attaching the truck bed extender 10 to a vehicle.

Figure 6:
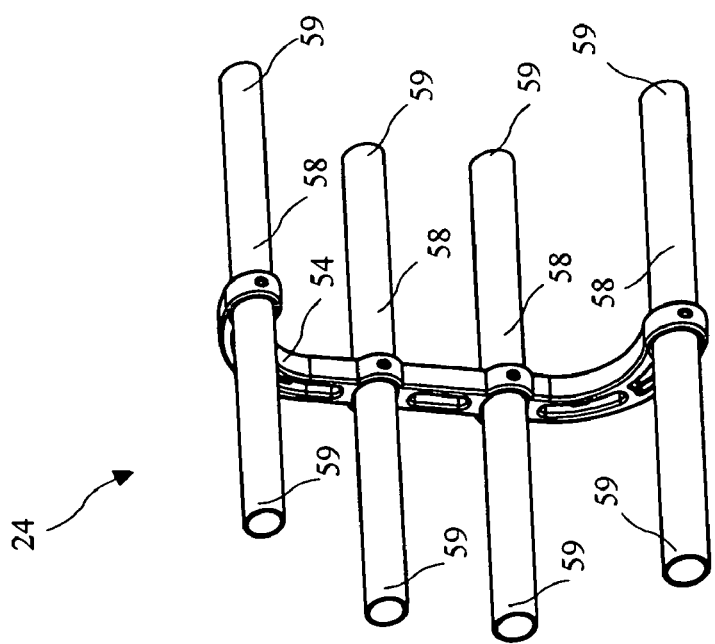
FIG. 6 is a detailed view of the center section.
Figure 12:
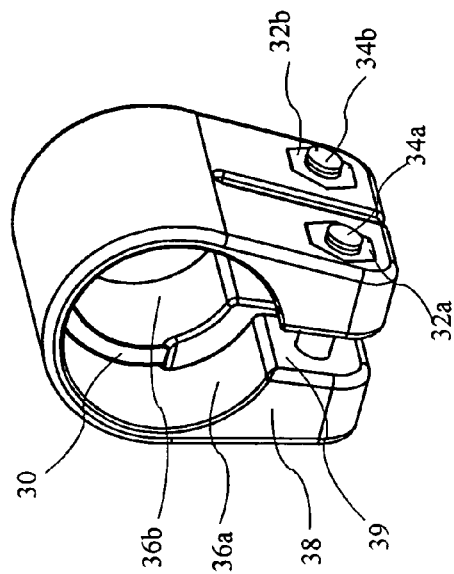
FIG. 12 is a detailed view of a clamp according to the present invention.

The rear member 12 is shown in FIG. 4, and comprises a center section 24, and two end sections 26. The center section 24 comprises a center vertical member 54 and at least two center horizontal members 58. Preferably, the center section 24 includes four center horizontal members 58. The end sections 26 comprise an end vertical member 56 and at least two end horizontal members 60. Preferably, the end sections 26 include four end horizontal members 60. The end horizontal members 60 are adapted to slidably engage the center horizontal members 58 to allow the width of the rear member 12 to be adjusted to fit a variety of truck bed widths. Clamps 28 are provided at ends 59 (see FIGS. 5 and 6) of the center horizontal members 58. The clamps 28 allow the width of the rear member 12 to be fixed once the rear member 12 is correctly adjusted to fit the truck bed 11. A detailed perspective view of a clamp 28 is shown in FIG. 12 and described below.

The center horizontal members 58 and the end horizontal members 60 are preferably made from aluminum, the center vertical member 54 and the end vertical members 56 are preferably made from plastic. The center horizontal members 58 are preferably approximately nineteen inches long and approximately 1.25 inches in diameter. The end horizontal members 60 are preferably approximately twenty two inches long and approximately one inch in diameter. The separation of top and bottom horizontal tubes is preferably approximately twelve inches, and the top and bottom horizontal tubes are preferably offset inwardly (i.e., toward the truck bed 11) relative to the center tube(s). The center horizontal members 58 and the end horizontal members 60 are preferably attached to the center vertical member 54 and the end vertical member 56 respectively by pop rivets.

A detailed depiction of the sliding cooperation of the center section 24 and the end sections 26 is shown in FIG. 5. The center horizontal members 58 and the end horizontal members 60 are preferably tubes, and more preferably round tubes. The end horizontal members 60 preferably slide into the center horizontal members 58 which allows for a wide and more stable spacing of the clamps 28 on ends 59 (see FIG. 6) of the center horizontal members 58. The end horizontal members 60 insert into the center horizontal members 58 as indicated by arrows 61. Tube guides 63 on ends of the end horizontal members 60 facilitate sliding the end horizontal members 60 through the center horizontal members 58. Each end section 26 includes a vertical end tube 80. A pin passageway 49 at the base of the vertical end tube 80 is provided to pivotally connect the rear member 12 to the mounting brackets 16.

Figure 7:
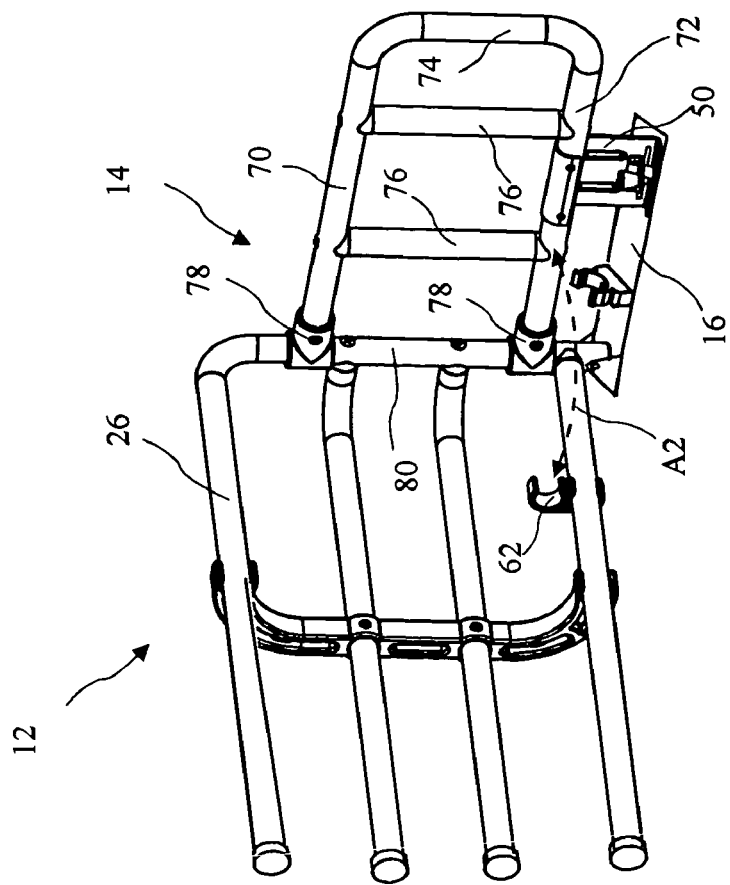
FIG. 7 depicts the cooperation of the side member with the rear member.

A detailed view of the side member 14, and the cooperation of the side member 14 with the rear member 12, is shown in FIG. 7. The side member 14 is constructed from a "U" shaped piece of material, preferably similar to the material used to construct the end horizontal members 60. The "U" shaped piece comprises an upper arm 70, lower arm 72, and vertical arm 74. The side member 14 is preferably approximately the same length as the tail gate 18 in order to fill the gap between the rear member and the truck bed side 22 (see FIG. 3). The side member 14 is preferably braced by two vertical braces 76 preferably of the same material used to form the "U". The side members 14 are preferably attached to the rear member 12 by Ts 78 which allow the side member 14 to rotate about the vertical end tube 80 of the end section 26, which Ts 78 are preferably made from plastic. Preferably, the side members 14 are approximately seventeen inches long, and nine inches high (outside dimensions.) While the example of the present invention shown in FIG. 7 describes side members in pivotal cooperation with the rear members, the side members may also the detachable from the rear member, wherein the side members may hook into onto receiving features and thus be detachably connected to the rear member, or be detachably connected by some other means. Any truck bed extender having foldable or detachable side members, which side members secure to mounting brackets mounted solely to a tail gate, is intended to come within the scope of the present invention.

The side member 14 swings along a second arc A2 from a second open position approximately perpendicular to the rear member 12, to a second folded position approximately parallel to the rear member 12. A first clip 62 attached to the rear member 12 is provided to engage the side member 14 to hold the side member 14 in the second folded position.

Figure 9:
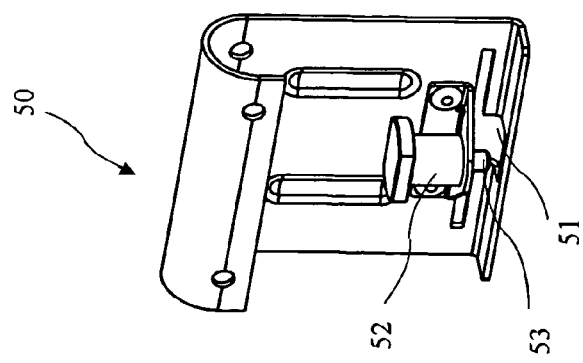
FIG. 9 shows details of the latch.
Figure 8:
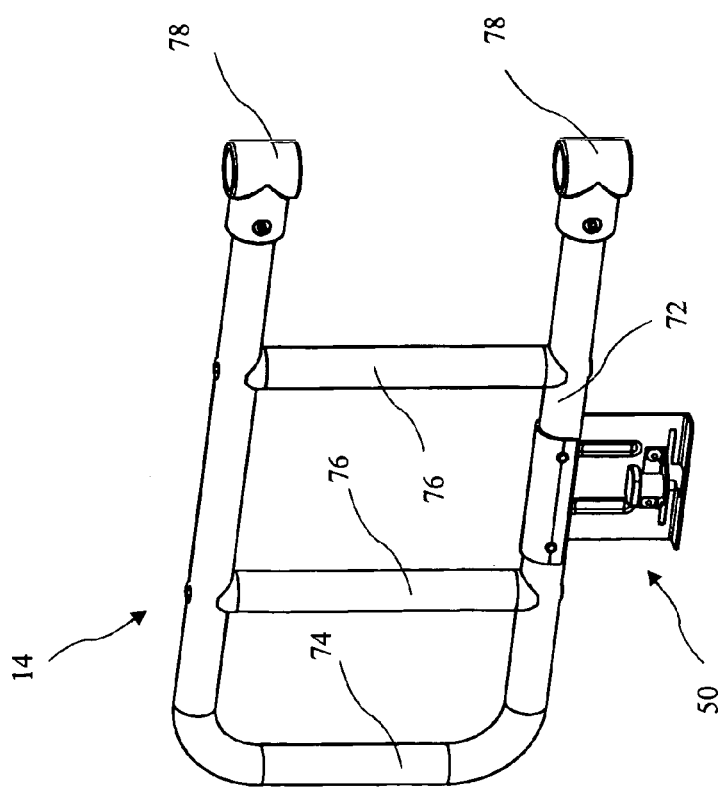
FIG. 8 shows a latch attached to the side section.

A more detailed view of the side member 14 is shown in FIG. 8. A latch 50 is attached to the lower arm 72 of the side member 14. The latch 50 cooperates with a guide 42 (see FIG. 11) to secure the side member 14 in the second open position. A more detailed view of the latch 50 is shown in FIG. 9. A guide mouth 51 is provided to allow the guide 42 enter the latch 50. The latch 50 includes a latch pin 52 biased downwardly (i.e., in a secured position, whereby the side member 14 is secured to the mounting bracket 16.)

Figure 10A:
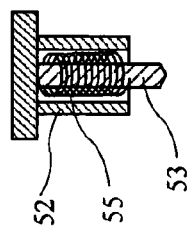
FIG. 10A is a cross-sectional view taken along line 10A—10A of FIG. 10 of the latch pin.
Figure 10:
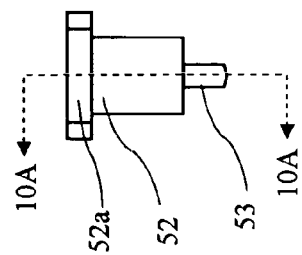
FIG. 10 is a latch pin.

A side view of the latch pin 52 is shown in FIG. 10, and a cross-sectional view taken along line 10A—10A of FIG. 10 is shown in FIG. 10A. The latch pin 52 is biased by in a latched position, preferably by a spring 55 attached at a lower spring end to the latch 50, and at an upper spring end, to the latch pin 52, wherein the spring resists pulling the latch pin upward. The latch pin 52 is substantially cylindrical in shape, and includes an increased width cap 52a allowing easier grasping of the latch pin 52. The pin end 53 cooperates with the pin receptacle 43 (see FIG. 11) to secure the side member 14 in the second open position. The latch pin may alternatively be conical, or have any other shape providing a grasping surface to pull the latch pin 52 upwards.

Figure 11:
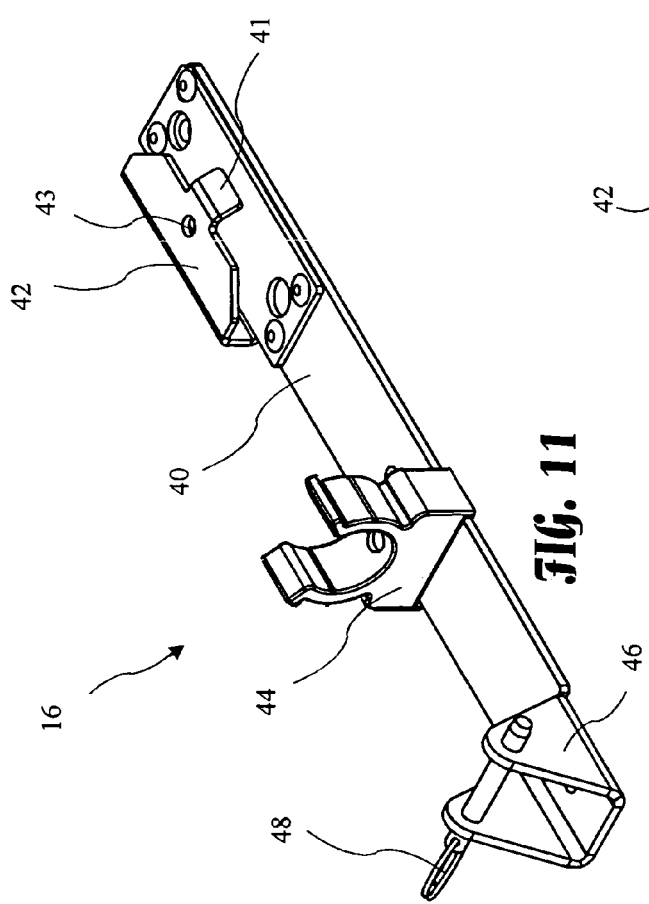
FIG. 11 is a detail view of a mounting bracket according to the present invention.

The mounting bracket 16 is shown in detail in FIG. 11. The mounting bracket 16 includes the guide 42 having a pin receptacle 43 and a ramp 41. The guide 42 cooperates with the latch 50 (see FIGS. 8 and 9) to direct the side member 14 into the second open position. The guide 42 passes through the guide mouth 51 and the ramp 41 raises the pin end 53 until the pin end 53 is over the pin receptacle 42 and the pin receptacle 43 receives the pin end 53 (see FIG. 10)

to secure the side member 14 in the second open position. The ramp 41 cooperates with the latch pin 52 (see FIG. 9) so that the pin end 53 rides up the ramp 41 and falls into the pin receptacle 43 when the side member 14 is moved into the second opened position. A second clip 44 may engage the vertical end tube 80 (see FIG. 7) to hold the rear member 12 in the first folded position (see FIG. 1 or 2). The hinge 46 and release pin 48 cooperate with the truck bed extender 10 to allow the truck bed extender 10 to be moved between the first folded position (see FIG. 1 or 2) and the first open position (see FIG. 3), and the truck bed extender 10 may be removed by removing the release pin 48. While it is preferred to include a removable release pin 48, a truck bed extender having a rear member 12 attached to brackets 16 by any rotatable means is intended to come within the scope of the present invention, for example, bolts, rivets, plastic insert, or the like, which need not provide for simple detachment of the rear member 12 from the mounting brackets 16. The mounting bracket 16 is preferably made from stainless steel.

Figure 11A:
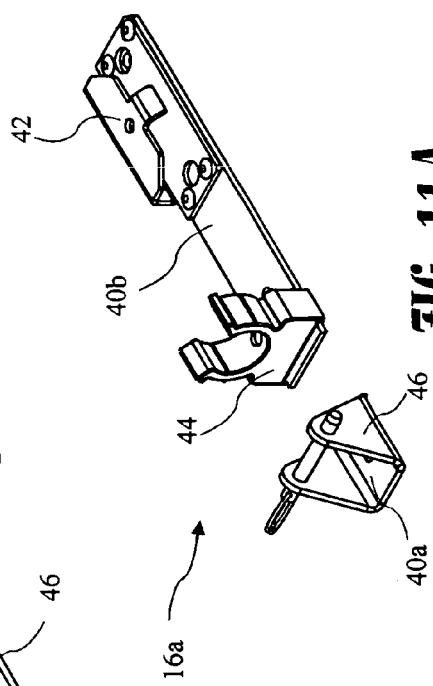
FIG. 11A shows a two piece mounting bracket according to the present invention.

A second mounting bracket 16*a* is shown in FIG. 11A. The mounting bracket 16*a* is two piece, with the hinge 46 on a first base 40*a*, and the clip 44 and guide 42 on a second base 40*b*. Alternatively, the hinge 46 and the clip 44 may be on a single base, and the guide 42 may be on a single base. In other embodiments, the rear member 12 may pivot on a piano hinge or the like, and the side members 14 may be secured to a latch 42 mounted independently or directly to the truck bed. Any truck bed extender wherein mounting brackets mounted to the tail gate are the only means necessary for attaching the truck bed extender to a vehicle, whether the mounting brackets are one piece, multi-piece, or cooperate with a hinge, is intended to come withing the scope of the present invention.

The clamp 28 is shown in detail in FIG. 12. The clamp 28 includes a clamp large Inside Diameter (ID) 36*a*, and a clamp small ID 36*b* which are separated by a clamp step 30. A clamp wall 38 includes a clamp gap 39, and clamp screws 34*a* and 34*b* cooperate with clamp nuts 32*a* and 32*b*, wherein tightening the clamp screw 34*a* causes the clamp large ID 36*a* to decrease, and thereby fix the clamp 28 to the tubing end 59 of the center section 24, and tightening the screw 34*b* causes the clamp small ID 36*b* to decrease, and thereby fix the clamp 28 to the end horizontal member 60 (see FIG. 5) and fix the width of the rear member 12.

Figure 13:
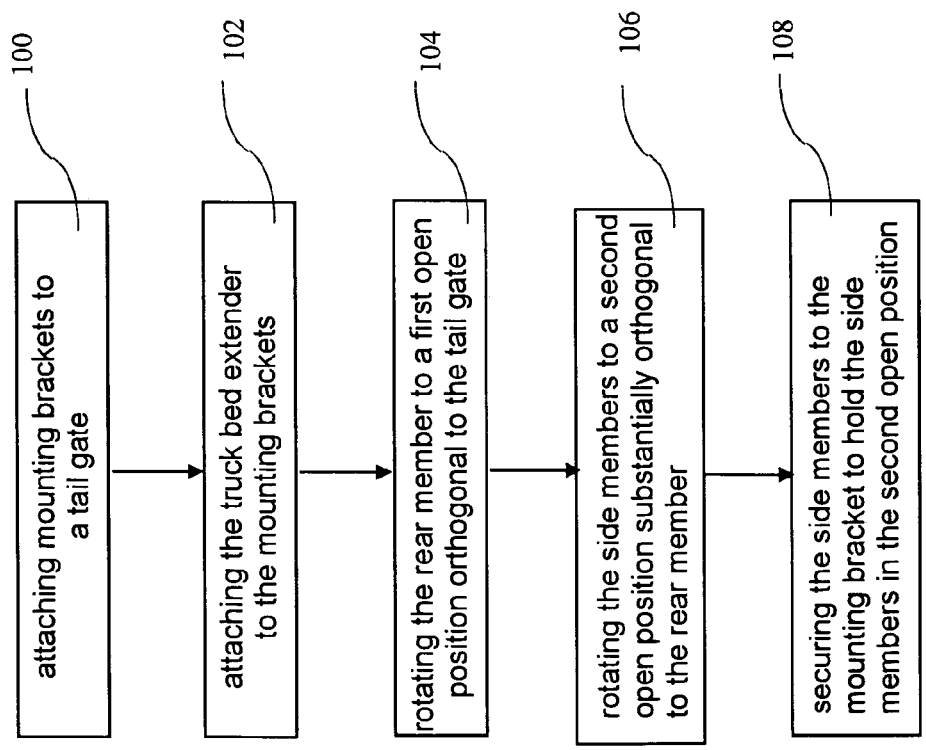
FIG. 13 depicts a method for mounting and using the truck bed extender of the present invention.

A method for mounting and using a truck bed extender is described in FIG. 13. The method comprises attaching mounting brackets 16 to a tail gate 18 at step 100, removably attaching the truck bed extender 10 to the mounting brackets 16 at step 102, rotating a rear member 12 to a first open position substantially orthogonal to the tail gate 18 at step 104, rotating the side members 14 to a second open position substantially orthogonal to the rear member 12 at step 106, and securing the side members 12 to the mounting brackets 16 to hold the side members 12 in the second open position at step 108. Alternatively, the mounting brackets 16 and rear member 12 may be attached to the tail gate 18 as a single unit.

The method may further include aligning pin passages 49 in the truck bed extender 10 with the hinges 46 and inserting release pins 48 through the pin passages 49 and the hinges 46, using latches 50 to secure the side members 14 to the mounting bracket 16. The truck bed extender may be folded out of the way by releasing the latches 50 to release the side members 14 from the mounting brackets 16, folding the side members 14 to a second folded position, and folding the rear member to a first folded position. The side members 14 may be held in the second folded position by engaging the side members 14 into the first clips 62, and the rear member 12 may be held in the first folded position by engaging the rear member 12 into the second clips 44.

While the invention herein disclosed has been described by means of specific embodiments and applications thereof, numerous modifications and variations could be made thereto by those skilled in the art without departing from the scope of the invention set forth in the claims.

We claim:

1. A truck bed extender comprising:
    a pair of mounting brackets suitable for attaching to a tail gate, the mounting bracket including guides;
    a rear member pivotally coupled to the tail gate, wherein the rear member has a first open position wherein the rear member is approximately orthogonal to the tail gate and a first folded position wherein the rear member is folded against the tail gate;
    a pair of side members including latches and having a second open position wherein the side members are approximately orthogonal to the rear member,
    wherein the side members secure to the mounting brackets through the cooperation of the latches with the guides to hold the side members in the second open position and the side members cooperate with the rear member to hold the rear member in the first open position.

2. The truck bed extender of claim 1, wherein the rear member cooperates with the mounting brackets to hold the rear member in the first folded position.

3. The truck bed extender of claim 2, wherein the mounting brackets include clips, wherein the rear member engages the clips to hold the rear member in the first folded position.

4. The truck bed extender of claim 1, wherein:
    the latches include latch pins biased in a secured position;
    the guides include pin receptacles; and
    the latch pins engage the pin receptacles to secure the side members in the second open position.

5. The truck bed extender of claim 1, wherein the mounting brackets include hinges, wherein the rear member pivots between the first open position and the first folded position by pivoting about the hinges.

6. The truck bed extender of claim 1, wherein the hinges include removable release pins, wherein removing the release pins releases the rear member from the hinges.

7. The truck bed extender of claim 1, wherein the mounting brackets are the only means necessary for securing the side members in the second open position.

8. A truck bed extender comprising:
    a pair of mounting brackets including guides;
    a rear member pivotally coupled to a tail gate, wherein the rear member has a first open position and a first folded position;
    a pair of side members including latches and pivotally coupled to the rear member and having a second open position and a second folded position,
    wherein the side members secure to the mounting brackets through the cooperation of the latches with the guides to hold the side members in the second open position, and the side members engage the rear member to hold the side members in the second folded position.

9. The truck bed extender of claim 8, wherein the rear member comprises:
    a center section comprising at least two center horizontal members and at least one center vertical member connecting the center horizontal members; and two end sections each comprising at least two end horizontal members and at least one end vertical member connecting the end horizontal members, wherein the end horizontal members slidably engage the center horizontal members and wherein the width of the rear member is adjustable by a degree of engagement.

10. The truck bed extender of claim 9, wherein the center horizontal members comprise center horizontal tubing and the end horizontal members comprise end horizontal tubing, wherein the end horizontal tubing slides into the center horizontal tubing to slidably engage.

11. The truck bed extender of claim 10, further including clamps fixed on tubing ends of the center horizontal tubing, wherein the clamps extend past the ends of the center horizontal tubing and releaseably grasp the end horizontal tubing to fix the width of the rear member.

12. The truck bed extender of claim 11, wherein the clamps include:

a clamp large Inside Diameter (ID) which is approximately the same size as a first Outside Diameter (OD) of the center horizontal tubing;

a clamp small ID which is approximately the same size as a second OD of the end horizontal tubing; and a clamp gap extending through a clamp wall, wherein squeezing the clamp gap together decreases the clamp large ID and the clamp small ID.

13. A method for mounting and using a truck bed extender, the method comprising:

attaching mounting brackets to a tail gate, the mounting brackets including guides;

attaching the truck bed extender to the tail gate, wherein the truck bed extender includes a rear member and side members including latches;

rotating the rear member to a first open position substantially orthogonal to the tail gate;

rotating the side members to a second open position substantially orthogonal to the rear member; and securing the side members to the mounting brackets through the cooperation of the latches with the guides to hold the side members in the second open position.

14. The method of claim 13, wherein attaching the truck bed extender to a tail gate comprises attaching the truck bed extender to the mounting brackets.

15. The method of claim 13, wherein the truck bed extender is removably attached, and wherein the mounting brackets include hinges and the hinges include release pins, and wherein removably attaching the truck bed extender to the mounting brackets comprises aligning pin passages in the truck bed extender with the hinges and inserting the release pins through the pin passages and the hinges.

16. The method of claim 13, the method further including:

releasing the latches to release the side members from the mounting brackets;

folding the side members to a second folded position; and folding the rear member to a first folded position.

17. The method of claim 16, wherein the rear member includes first clips, the method further including, following folding the side members to a second folded position, engaging the side members into the first clips to hold the side members in the second folded position.

18. The method of claim 16, wherein the mounting brackets include second clips, the method further including, following folding the rear member to a first folded position, engaging the rear member into the second clips to hold the rear member in the first folded position.

\* \* \* \* \*